Nov. 18, 1952 A. AUGUSTIN-NORMAND 2,618,204
TOOLHEAD
Filed April 5, 1949
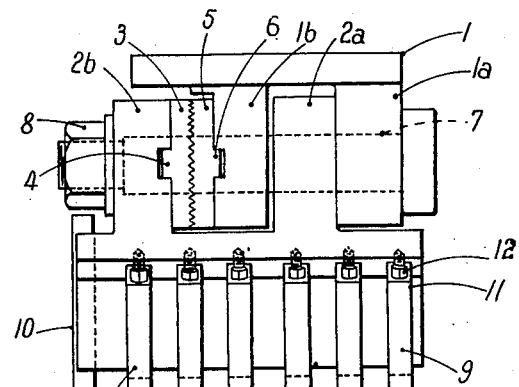
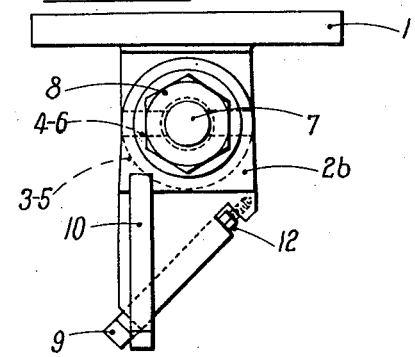
Inventor:
Augustin Augustin-Normand
By Robert E Burns
Attorney Patented Nov. 18, 1952

2,618,204

UNITED STATES PATENT OFFICE 2,618,204

TOOLHEAD

Augustin Augustin-Normand, Le Havre, France, assignor to Société Anonyme des Anciens Etablissements Charles Berthiez, Paris, France, a corporation of France Application April 5, 1949, Serial No. 85,695
In France April 22, 1948

4 Claims. (Cl. 90—52)

The present invention relates to a tool holder for planing machines fitted with self-acting lift of the tools at the end of the travel.

The object of the invention is to provide an arrangement in which monobloc tools or tool holders of square section are replaced by a universal tool holder providing for the simultaneous use of several tools and cutters during the useful travel of the planing machine, or during its two travels if it is designed to work in both directions.

A device according to the invention provides, moreover, for imparting to the tools all desirable adjustments through an angle of 180°, which adjustment can be effected by operating a single lock nut.

The result of these advantages is a considerable increase in production in the rough cuts, by the division of the cuttings to the advantage of the feeds, and therefore of the output, as well as of the power absorbed. In the case of fine cuts the output is proportional to the number of tools in action.

One constructional form of a device made in conformity with the invention is illustrated by way of example in the accompanying drawing, in which:

Fig. 1 illustrates the whole of the top rest or slide, to be adapted to the different slides of planing machines, and a tool holder on which from one to seven tools, or more if the power of the planing machine permits, may be mounted, according to requirements.

Fig. 2 is an elevation of the arrangement shown in Fig. 1.

As shown in Fig. 1 the device comprises a tool rest or slide 1, mounted on the carriage of the planing machine, and a tool holder 2 on which from one to seven tools may be mounted in recesses 11 provided for this purpose. The head of the top rest 1 has the shape of parallelepiped on and is adapted to be locked on the slide of the planing machine. It has two jaws 1a, 1b between which is disposed a clamping lug 2a solid with the tool holder 2, which also has a front clamping lug 2b. Between the clamping lug 2b and the jaw 1b are disposed a locking and adjusting head 3 formed on one of its two surfaces with an integral key 4 and, on the other surface, with one hundred and eighty teeth providing for the adjustment and locking of the tool holder (the external diameter being graduated in one hundred and eighty divisions). A head 5, similar to the head 3, and having a similar key 6, is mounted symmetrically with the head 3 and co-operates with it for the locking and adjustment operation.

The mounting of the tool holder on its rest is effected by means of a spindle 7, which is passed through the clamping lug 2b, the heads 3 and 5, the jaw 1b, the clamping lug 2a and the jaw 1a, and is locked by a lock nut 8.

On the tool holder are suitably mounted the cutting tools 9, having a mean weight of, for example, 0.300 kg., and comprising either treated bars, or tools tipped or headed with tungsten carbide. The tools are preferably fitted into the tool holder in such a way as to avoid vibrations and they are locked by means of flanges and screws. A cutting tool 10 is provided for removing irregularities caused by the feed of the turning tools and may with advantage be mounted at the end of the tool holder.

The adjustment of the lift of the tools is effected by means of the screws 12.

The device according to the invention thus provides for the rational use of modern planing machines.

In addition to increased output, the invention provides substantial economy in the cost price of the tools and in the times required for grinding and adjusting the tools, it being understood that they are ground at both ends and that it is only necessary to turn them for further use.

I claim:

1. A tool holder for a planing machine adapted for the simultaneous utilization of a plurality of tools in at least one working direction, comprising, in combination, a tool holder element having a pair of spaced clamping lugs, a slide member adapted to be secured to the slide of the planing machine, said slide member having spaced jaws positioned adjacent said clamping lugs, a pair of locking members having interengaging teeth, one of said locking members being secured to a clamping lug and the other of said locking members being secured to the adjacent jaw of the slide member, and a spindle passing through aligned apertures in said jaws, said lugs and said locking members, said spindle being provided with means for releasably engaging the teeth of said locking members whereby to hold said slide element and said tool holder in adjustable fixed relative position.

2. A tool holder for a planing machine adapted for the simultaneous use of a plurality of tools in at least one working position, comprising, in combination, a tool holder element having a pair of spaced clamping lugs and a plurality of tool holding means, said means being arranged to support at least one set of tools engageable with the surface to be worked during travel of the tool holder, a slide member adapted to be secured to the slide of the planing machine, said slide member having spaced jaws positioned adjacent said clamping lugs, a pair of locking members having interengaging teeth, one of said locking members being secured to a clamping lug and the other of said locking members being secured to the adjacent jaw of the slide member, and a spindle passing through aligned apertures in said jaws, said lugs and said locking members, said spindle being provided with means for releasably engaging the teeth of said locking members whereby to hold said slide element and said tool holder in adjustable fixed relative position.

3. A tool holder for a planing machine adapted for the simultaneous use of a plurality of tools in at least one working position, comprising, in combination, a tool holder element having a pair of spaced clamping lugs and a plurality of tool holding means, said means being arranged to support at least one set of tools engageable with the surface to be worked during travel of the tool holder, and a finishing tool mounted at one end of the tool holder element, said finishing tool being disposed in a different plane from that of the tools mounted in the tool holder element and being positioned to be drawn over the work surface which has been engaged by the said tools in the preceding stroke of the tool holder element to eliminate irregularities remaining after the cutting action of said tools, whereby rough cutting and finishing are effected simultaneously.

4. A tool holder for a planing machine adapted for the simultaneous use of a plurality of tools in at least one working position, comprising, in combination, a tool holder element having a pair of spaced clamping lugs and a plurality of tool holding means, said means being arranged to support at least one set of tools engageable with the surface to be worked during travel of the tool holder, the tools being arranged in laterally off-set relationship in such manner that each tool engages a different portion of the work being planed whereby there is produced a plurality of parallel cuts during each stroke of the tool holder.

AUGUSTIN AUGUSTIN-NORMAND.

REFERENCES CITED

The following references are of record in the file of this patent:

UNITED STATES PATENTS

| Number | Name | Date |
|---|---|---|
| 154,540 | Carr et al. | Sept. 1, 1874 |
| 267,147 | Byrne | Nov. 7, 1882 |
| 1,775,963 | McCarroll | Sept. 16, 1930 |
| 2,251,834 | Praeg | Aug. 5, 1941 |
| 2,252,655 | Young et al. | Aug. 12, 1941 |
| 2,451,371 | Backstrom | Oct. 12, 1948 |